United States Patent [19]

Polderman

[11] Patent Number: 4,859,316

[45] Date of Patent: Aug. 22, 1989

[54] PROCESS AND APPARATUS FOR WITHDRAWING SOLIDS FROM A VESSEL

[75] Inventor: Hugo G. Polderman, Amsterdam, Netherlands

[73] Assignee: Shell Oil Company, Houston, Tex.

[21] Appl. No.: 112,981

[22] Filed: Oct. 27, 1987

[30] Foreign Application Priority Data

Dec. 1, 1986 [GB] United Kingdom ............... 8628692

[51] Int. Cl.$^4$ ............................................. C10G 11/16
[52] U.S. Cl. .................................. 208/166; 208/173; 208/146; 34/57 R; 406/142
[58] Field of Search ............... 208/146, 150, 157, 173, 208/174, 176, 166; 34/57 R; 406/142, 143, 152; 422/140, 145

[56] References Cited

U.S. PATENT DOCUMENTS

| | | | |
|---|---|---|---|
| 2,541,077 | 2/1951 | Leffer | 406/143 X |
| 2,567,669 | 3/1952 | Weinrich | 208/174 X |
| 2,587,670 | 3/1952 | Weinrich | 208/174 X |
| 2,673,764 | 3/1954 | Cummings et al. | 406/143 |
| 2,711,386 | 6/1955 | Delaplaine | 208/174 |
| 2,762,658 | 9/1956 | Shirk | 406/143 X |
| 2,800,432 | 7/1957 | Weinrich | 406/142 X |
| 3,849,295 | 11/1974 | Addison | 208/150 X |
| 3,856,662 | 12/1974 | Greenwood | 208/174 X |
| 4,568,523 | 2/1986 | Wijffels et al. | 422/191 |
| 4,590,045 | 5/1986 | Van Der Wal et al. | 422/216 |
| 4,664,782 | 5/1987 | Galiasso et al. | 208/173 X |

FOREIGN PATENT DOCUMENTS 2579573 10/1986 France .
6135844 2/1986 Japan .

OTHER PUBLICATIONS

Reed & Mason, Journal of Pipelines (5, 1985, 67–75), The Effect of Suction Nozzle Geometry on the Performance of Pneumatic Ship Unloaders.

*Primary Examiner*—Glenn Caldarola
*Attorney, Agent, or Firm*—Y. Grace Tsang

[57] ABSTRACT

A process for withdrawing solids from a vessel utilizing an inserted nozzle comprising an outer tube and one or more inner tube(s) retracted inside the outer tube, which process comprises introducing an entrainment liquid into the vessel upstream from a pick-area where the solids are withdrawn, introducing dilution transport liquid into the area for solids to be removed through the outer tube in such a way that it does not substantially influence the flow of the solids and the entrainment liquid introduced upstream from the pick-up area, and withdrawing transport liquid and solids through the retracted inner tube(s).

13 Claims, 4 Drawing Sheets

1

PROCESS AND APPARATUS FOR WITHDRAWING SOLIDS FROM A VESSEL

FIELD OF THE INVENTION

The present invention relates to a process and apparatus for withdrawing a slurry of solids and a transport fluid from a vessel. The invention further relates to the use of the process and apparatus in hydroconversion processes, such as hydrocracking, hydrogenation, hydrodesulphurization and hydrodemetallization.

BACKGROUND OF THE INVENTION

It is known to withdraw solids, such as catalyst particles which gradually have become deactivated, e.g. during operation of hydrocarbon processes in which they are employed, from vessels, especially reactors which are equipped with a movable catalyst bed. Such vessels usually comprise one or more screen sections for separating the reactor effluent from the catalyst, the vessel being provided with separate outlet means for effluent and catalyst in a lower part of the vessel. Fresh and/or regenerated catalyst can be fed continuously or at intervals at the top and spent catalyst is removed from the bottom of the vessel via an outlet system containing a rotating valve as for instance as described in U.S. Pat. No. 4,590,045 issued May 20, 1986.

Since catalyst fines and smaller (broken) catalyst particles have a tendency to accumulate near the reactor bottom they will block the rotating valve and thus reduce the withdrawal flow of spent catalyst.

It has now been found that the problem encountered with the use of rotating valve systems can be solved in a different manner.

It should be noted that it is known from Reed & Mason, Journal of Pipelines (5, 1985, 67-75) to unload ships in an economically attractive way with an air-driven withdrawing system comprising a suction nozzle which consists of two tubes mounted co-axially, wherein the inner conveying tube has to protrude from the outer tube in order to obtain meaningful results.

SUMMARY OF THE INVENTION

The present invention relates to a process for withdrawing solids from a vessel utilizing an inserted nozzle to introduce transport fluid into an area for solids to be removed and withdrawing solids and fluid through an inner tube, which process comprises withdrawing a slurry of transport fluid and solids through a retracted inner tube. Therefore, the process according to the present invention allows direct discharge of particles from a vessel by means of a withdrawal system without the necessity to use a mechanical rotating valve.

BRIEF DESCRIPTION OF THE DRAWINGS

Throughout FIGS. 1-5 the same reference numerals have been used for similar puposes, and accessories such as valves, pumps and control instruments not necessary for the purpose of understanding the present invention are not (all) shown.

DETAILED DESCRIPTION OF THE INVENTION

The invention will now be illustrated by way of FIGS. 1-5.

Figure 1:
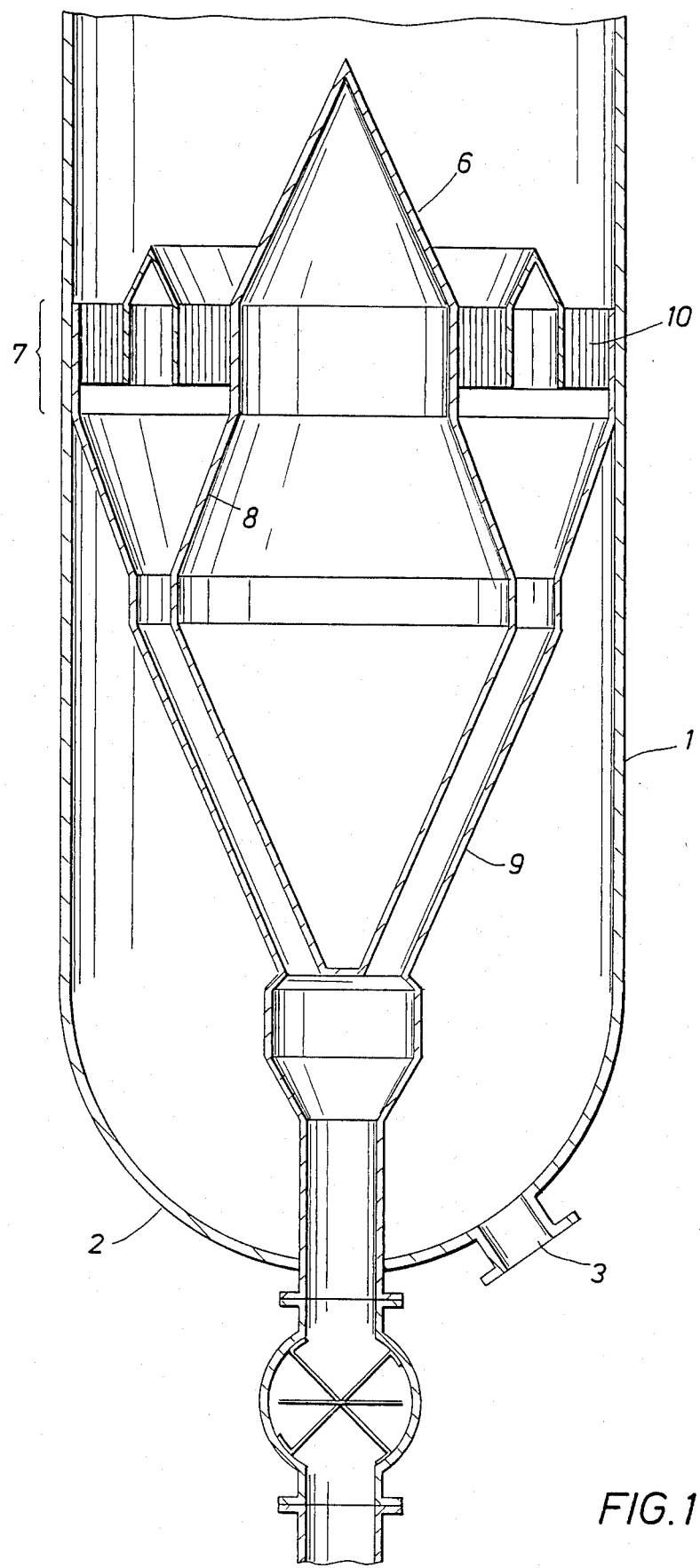
FIG. 1 schematically shows a part of a longitudinal cross-section of a conventional reactor vessel comprising a rotating valve system.
Figure 2:
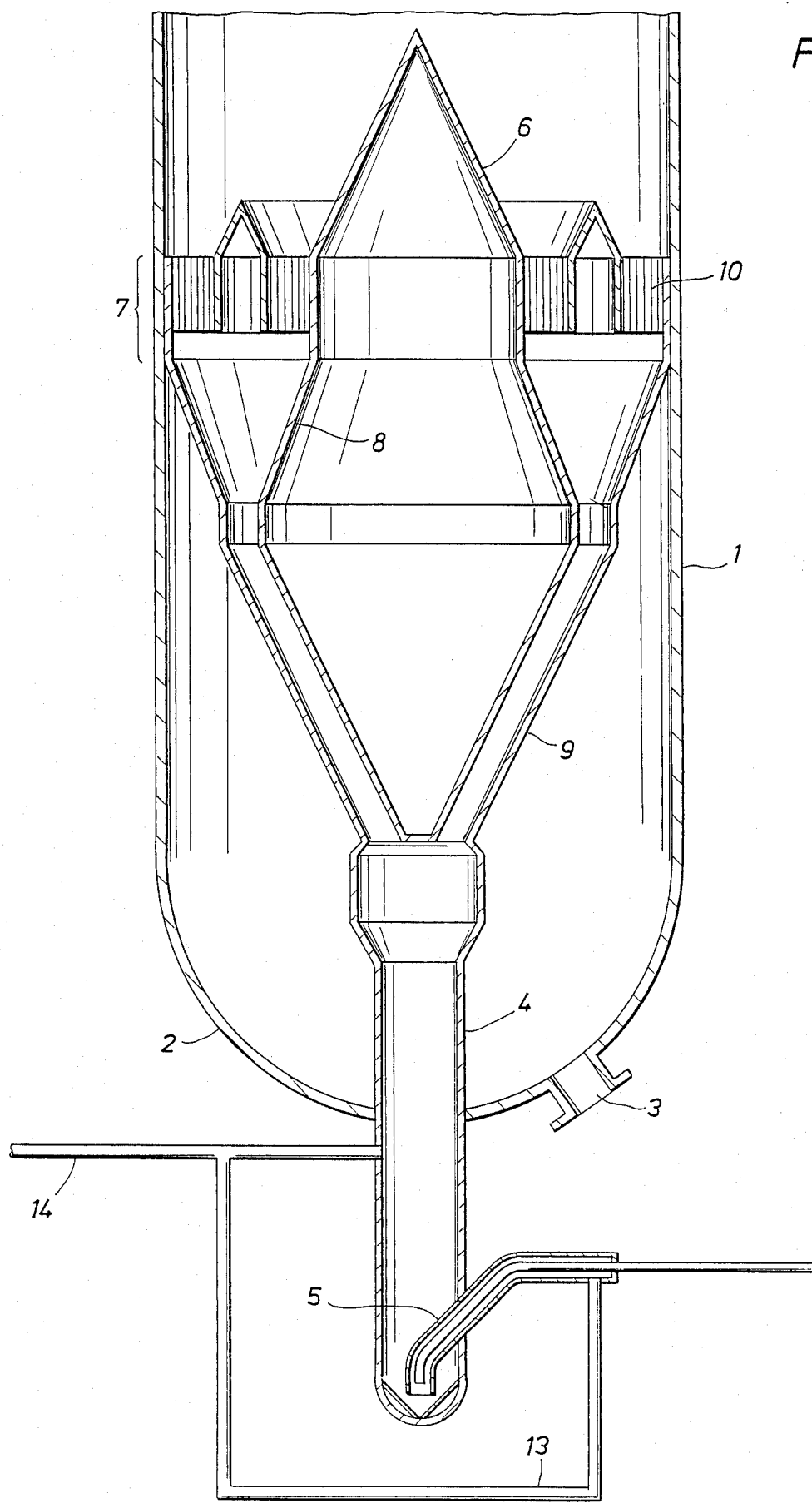
FIG. 2 schematically shows a longitudinal cross-section of a part of a reactor vessel utilized in the process according to the invention.

In FIG. 1 the bottom part of a normally vertically extending reactor utilized in a conventional process, such as hydroconversion, is depicted, comprising the lower part of the reactor side wall 1 and the bottom end shell 2 which is provided with reactor effluent outlet means 3. In FIG. 2 the bottom part of a normally vertically extending reactor utilized in a process according to the invention is depicted wherein the bottom end shell 2 is provided with a catalyst pick-up vessel 4 including an inserted nozzle 5.

The reactor (see FIGS. 1 and 2) is provided with internals for supporting catalyst particles, said internals consisting of a downwardly converging conical surface 6 terminating at the lower end thereof in a substantially vertical outlet channel 7 for the passage of catalyst particles and reactor effluent. To direct catalyst particles from channel 7 towards catalyst pick-up vessel 4, a lower conical segment 8 is arranged between the lower end of outlet channel 7 and the upper end of the catalyst pick-up vessel 4 via tube 9. The angle with the vertical axis of the lower conical segment 8 should be such that the catalyst can smoothly pass through this segment 8 towards the catalyst pick-up vessel. The conical surface 6, the outer channel 7 and the lower conical segment 8 are supported on the inner surface of the reactor wall 1. Part or all of the outlet channel 7 is provided with a cylindrical screen section 10, for separating the reactor effluent, which passes through the screen section from the catalyst particles, said screen section 10 forming part of the wall of the outlet channel 7.

Figure 3:
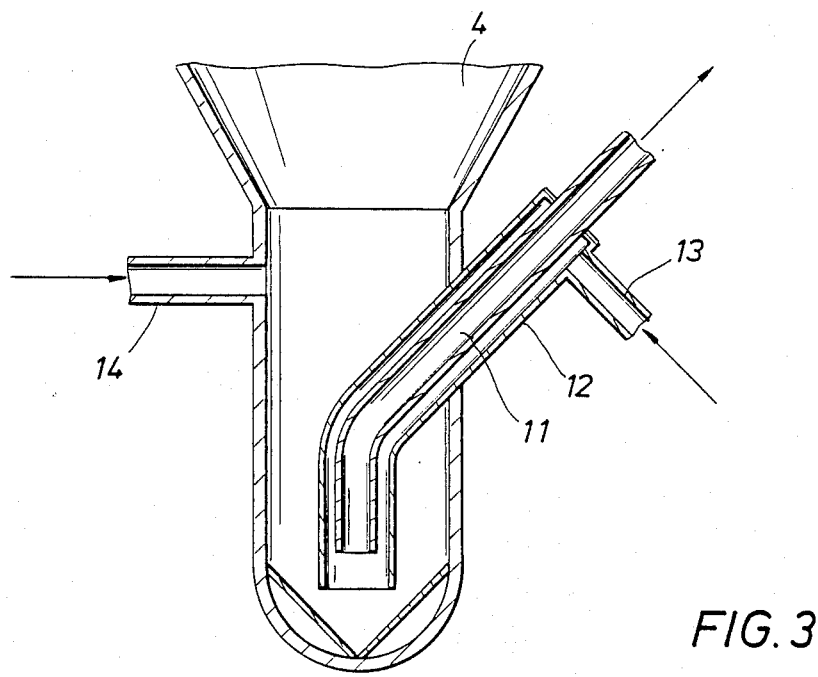
FIG. 3 schematically shows the pick-up vessel and inserted nozzle in more detail.

In FIG. 3 the pick-up vessel 4 is depicted in more detail. The inserted nozzle comprises an inner tube 11 which is located inside the outer tube 12 and a dilution supply pipe 13. The inner tube 11 and the outer tube 12 normally have diameter ratios in the range of between 0.30 and 0.90, and in particular 0.40-0.65. For circular tubes, cross-sectional area=$\pi/4$ (diameter)$^2$. Accordingly, the inner/outer tube diameter ratios are equivalent to the square root of the cross-sectional area ratios. Thus, the equivalent inner/outer tube cross-sectional area ratios should preferably range between 0.09 and 0.81, and in particular between 0.16 and 0.42. The inner tube 11 can be retracted inside the outer tube. The distance between the end of the inner tube and the end of the outer tube can be up to 5.0 times the outer tube diameter, and in particular in the range of between 0.5 and 1.5 times the outer tube diameter.

Preferably the catalyst pick-up vessel 4 includes an entrainment fluid supply pipe 14 through which part of the transport flow (primary flow) can be introduced into the bottom area of the reactor upstream of the pick-up area for entrainment purposes. A further part of the transport fluid flow (secondary flow) or a different transport fluid can be led controllably into the pick-up area of the reactor through the outer tube 12.

By splitting up the transport fluid flow in two parts the velocity and concentration of the slurry to be withdrawn through an inner tube can be independently controlled. In this arrangement the slurry is entirely entrained by the primary flow passing through the pick-up vessel 4. The secondary dilution flow introduced via the outer tube 12 does not substantially influence the entrainment flow. This complete separation of entrainment and dilution is one of the advantages of the easily controllable system.

Figure 4:
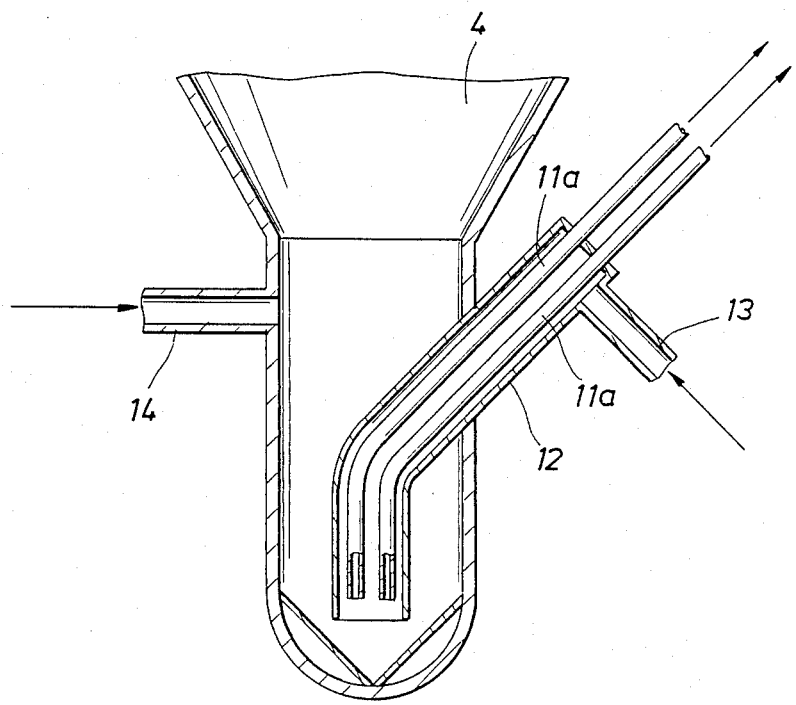
FIG. 4 schematically shows a further embodiment of the present invention, wherein the withdrawal system comprises two inner tubes located inside the outer tube.

The process according to the present invention thus provides the possibility to pick-up the solids and make up the slurry to be transported simultaneously and to feed transport fluid to the system without disturbance of the slurry flow in the reactor. In FIG. 4 an optional embodiment of the reactor utilized in a process according to the invention is depicted wherein the withdrawal system comprises an outer tube 12 and two inner tubes 11a. Alternatively, the withdrawal system may comprise an outer tube 12 and more than two inner tubes 11a.

Figure 5:
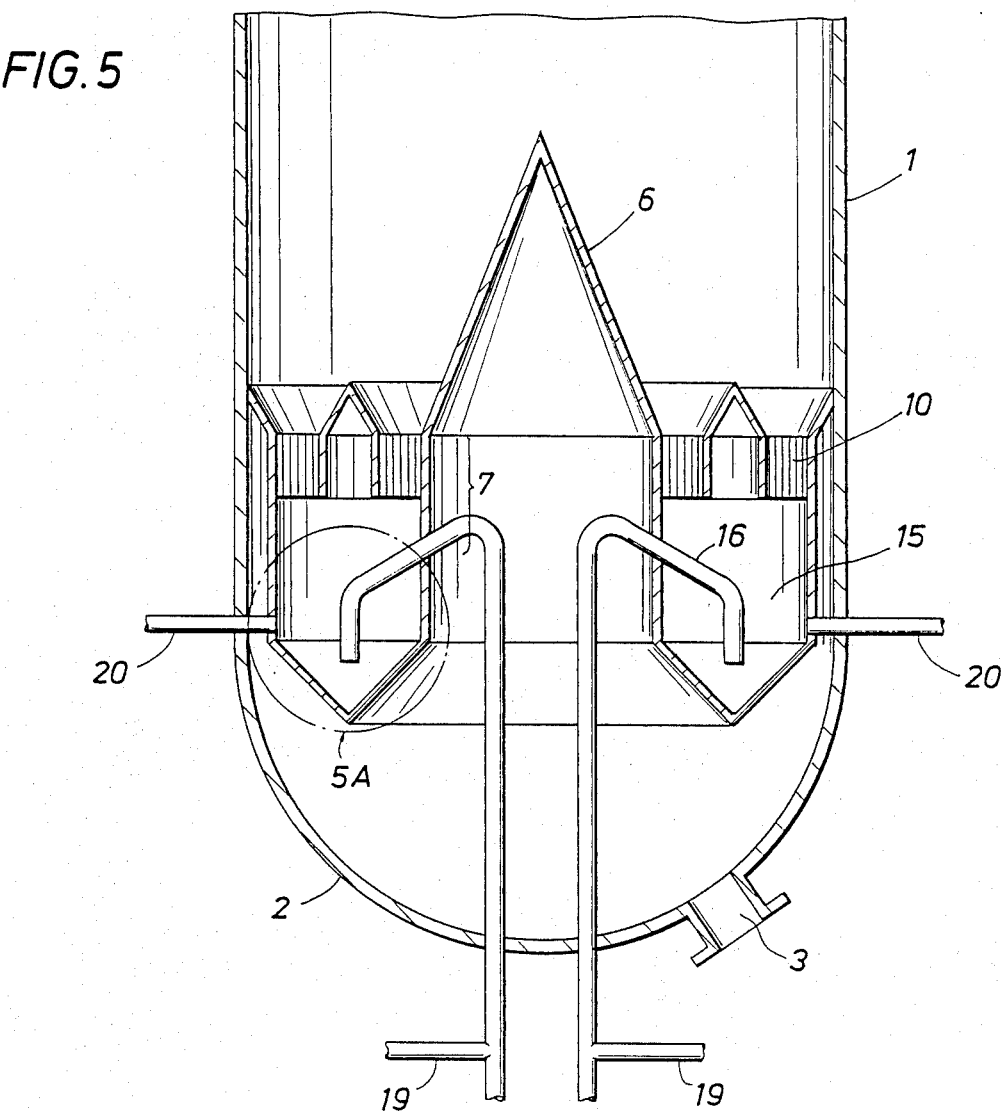
FIGS. 5 and 5a schematically shows preferred embodiment of the present invention.
Figure 5A:
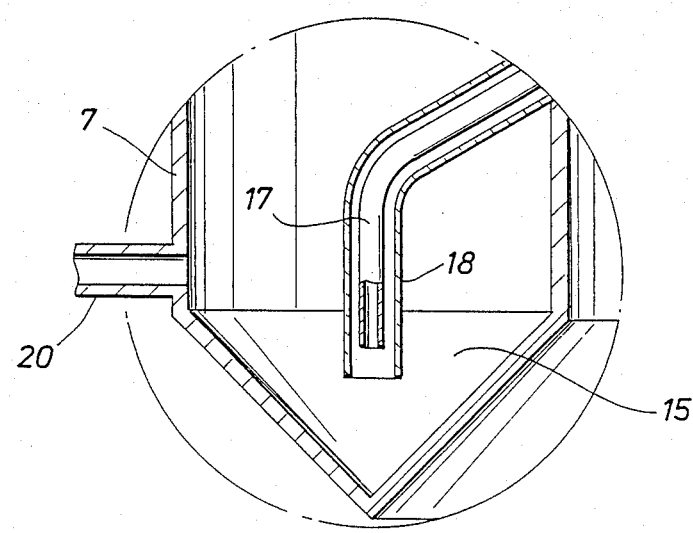

In FIG. 5 and FIG. 5A a preferred embodiment of the reactor utilized in a process according to the invention is depicted wherein the bottom part outlet channel 7 is directly connected to a pick-up means 15 which includes an insert nozzle 16 comprising an inner tube 17 which is located inside the outer tube 18 and dilution pipe 19. An entrainment pipe 20 is connected to the pick-up means 15 upstream the pick-up area from where the slurry is to be withdrawn. This embodiment is not limited to two inserted nozzles as depicted but the number of inserted nozzles may range from two to for example 12, depending on the size of the individual outlet channels 7 chosen. It will be understood, especially with a large number of inserted nozzles, that the inserted nozzles can terminate at their lower ends in a single catalyst withdrawal pipe passing through an opening in the bottom of the vessel thereby forming a single catalyst outlet instead of all the individual inserted nozzles extending through openings in the bottom of the vessel. For detailed description of bottom internals reference is made to U.S. Pat. No. 4,568,523.

During operation of the reactor, catalyst and reactant can be supplied into the upper part of the interior of the reactor. Having passed the conical surface 6 (see FIG. 2) catalyst particles and reactor effluent enter the outlet channels(s) 7 where reactor effluent is separated from catalyst particles via screen section 10. The catalyst moves downwardly through the outlet channel 7 and via the interior of the lower conical segment 8 and tube 9 into the catalyst pick-up vessel 4.

Via entrainment pipe 14 which is connected with the catalyst pick-up vessel 4 a transport fluid, preferably an oil, is fed to the catalyst pick-up vessel 4 to sustain the flow entraining catalyst from the pick-up area and to prevent effluent which passed with catalyst particles screen section 10 from flowing downwards into the catalyst pick-up vessel 4. Dilution pipe 13 (see FIG. 3) is connected to the outer tube 12 via which part of the same or a different transport fluid is introduced into the pick-up area to withdraw a slurry of transport fluid and catalyst particles through an inner tube 11.

The hydroconversion processes which can be carried out suitably according to the present invention comprise hydrogenation, hydrocracking, hydrodesulphurization and hydrodemetallization of hydrocarbon oil residues.

The invention also relates to an apparatus suitable for carrying out the process as described hereinbefore comprising a normally vertically extending substantially cylindrical vessel with one or more inlet means for fresh and/or regenerated catalyst and/or liquid and/or gas, containing catalyst supporting and guiding means in the shape of one or more downwardly converging conical surfaces, one or more vertical outlet channels connected to the lower end(s) of the conical surface(s), the supporting and guiding means comprising one or more screen sections for withdrawal of reactor effluent from the catalyst, separate outlet means for reactor effluent and catalyst, said apparatus comprising a system including an inserted nozzle containing a retracted inner tube for withdrawing a slurry of transport fluid and solids.

The inner/outer tube diameter ratio preferably ranges between 0.30 and 0.90, and in particular between 0.40 and 0.65, i.e. the equivalent inner/outer tube cross-sectional area ratios should preferably range between 0.09 and 0.81, and in particular between 0.16 and 0.42. An inner tube can be retracted inside the outer tube. The distance between the end of the inner tube and the end of the outer tube can be up to 5.0 times the outer tube diameter, and in particular in the range of between 0.5 and 1.5 times the outer tube diameter.

The withdrawal system is preferably provided with means to vary the extent of retraction of the inner tube 11 inside the outer tube 12 in order to comply with different slurry concentrations.

The ranges and limitations provided in the instant specification and claims are those which are believed to particularly point out and distinctly claim the instant invention. It is, however, understood that other ranges and limitations that perform substantially the same function in substantially the same manner to obtain the same or substantially the same result are intended to be within the scope of the instant invention as defined by the instant specification and claims.

I claim:

1. A process for withdrawing solids from a vessel utilizing an inserted nozzle comprising an outer tube and one or more inner tube(s) retracted inside the outer tube, which process comprises introducing an entrainment liquid into the vessel upstream from a pick-up area where the solids are withdrawn, introducing dilution transport liquid into the area for solids to be removed through the outer tube in such a way that it does not substantially influence the flow of the solids and the entrainment liquid introduced upstream from the pick-up area, and withdrawing transport liquid and solids through the retracted inner tube(s).

2. The process according to claim 1, which comprises the use of an oil as the transport liquid.

3. The process according to claim 1, wherein the ratio of (the sum of) the cross-sectional area(s) of said inner tube(s) to the cross-sectional area of the outer tube is in the range between about 0.09 and about 0.81.

4. The process according to claim 1, wherein the ratio of (the sum of) the cross-sectional area(s) of said inner tube(s) to the cross-sectional area of the outer tube is in the range between about 0.16 and about 0.42.

5. The process according to claim 1, which comprises the use of inner tube(s) which is retracted inside the outer tube up to 5.0 times the outer tube diameter.

6. The process according to claim 1, which comprises the use of inner tube(s) which is retracted inside the outer tube between about 0.5 to about 1.5 times the outer tube diameter.

7. The process according to claim 1, which comprises the use of a movable catalyst bed reactor.

8. The process according to claim 7, which comprises the use of a movable catalyst bed reactor wherein hydroconversion processes are carried out.

9. The process according to claim 8, wherein said hydroconversion processes are selected from the group consisting of hydrogenation, hydrocracking, hydrodesulfurization and hydrodemetalization of hydrocarbon oil.

10. The process according to claim 9, which comprises the use of catalyst particles to be withdrawn which contain one or more metals having hydrogenation activity on a carrier.

11. The process according to claim 10, which comprises the use of solids-containing spent catalyst particles.

12. The process according to claim 1, which comprises the use of two or more inserted nozzles to withdraw a slurry of solids and transport liquid from appropriated area(s) from where the slurry is to be withdrawn.

13. A process for withdrawing solids-containing spent catalyst particles from a movable catalyst bed reactor adapted for the hydroconversion of hydrocarbon oil residues using an inserted pick-up nozzle comprising an outer tube and one or more inner tube(s) retracted inside the outer tube; wherein the ratio of the sum of the area(s) of said inner tube(s) to the area of said outer tube for each nozzle is in the range of between about 0.16 and about 0.42; wherein said inner tube(s) is retracted inside the outer tube between about 0.5 to about 1.5 times the outer tube diameter; said process comprising introducing oil as a transport liquid to the reactor as (a) an entrainment flow stream introduced into the reactor upstream of a pick-up area and (b) a dilution flow stream which is led to the pick-up area via the outer tube of the inserted nozzle and withdrawing a slurry of solids and oil through said retracted inner tube(s).

* * * * *